(12) United States Patent
Sobanski et al.

(10) Patent No.: US 11,512,596 B2
(45) Date of Patent: Nov. 29, 2022

(54) VANE ARC SEGMENT WITH FLANGE HAVING STEP

(71) Applicant: RAYTHEON TECHNOLOGIES CORPORATION, Farmington, CT (US)

(72) Inventors: Jon E. Sobanski, Glastonbury, CT (US); Robert A. White, III, Meriden, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 0 days.

(21) Appl. No.: 17/212,233

(22) Filed: Mar. 25, 2021

(65) Prior Publication Data
US 2022/0307374 A1 Sep. 29, 2022

(51) Int. Cl.
*F01D 5/14* (2006.01)
*F02C 7/00* (2006.01)

(52) U.S. Cl.
CPC ............... *F01D 5/147* (2013.01); *F02C 7/00* (2013.01); *F05D 2220/32* (2013.01); *F05D 2230/31* (2013.01); *F05D 2230/90* (2013.01); *F05D 2240/24* (2013.01); *F05D 2240/30* (2013.01); *F05D 2240/55* (2013.01); *F05D 2300/6033* (2013.01)

(58) Field of Classification Search
CPC .... F02C 7/00; F05D 2220/32; F05D 2230/31; F05D 2230/90; F05D 2240/24; F05D 2240/30; F05D 2240/55; F05D 2300/6033
See application file for complete search history.

(56) References Cited

U.S. PATENT DOCUMENTS

| 6,050,776 | A | 4/2000 | Akagi et al. |
| 6,131,800 | A | 10/2000 | Fernihough et al. |
| 6,553,665 | B2 | 4/2003 | Gunn et al. |
| 11,073,039 | B1* | 7/2021 | Whittle .................. F01D 9/042 |
| 11,156,116 | B2* | 10/2021 | Kamrath ................ F01D 9/047 |
| 2006/0045745 | A1* | 3/2006 | Synnott ................ F01D 11/005 |
| | | | 416/219 R |
| 2007/0141368 | A1* | 6/2007 | Farmer .................. F01D 5/288 |
| | | | 427/456 |

(Continued)

FOREIGN PATENT DOCUMENTS

| EP | 2662529 | 11/2013 |
| EP | 3121379 | 1/2017 |

OTHER PUBLICATIONS

European Search Report for European Patent Application No. 22164217.6 dated Sep. 23, 2022.

*Primary Examiner* — Jesse S Bogue
(74) *Attorney, Agent, or Firm* — Carlson, Gaskey & Olds, P.C.

(57) ABSTRACT

A vane arc segment includes an airfoil fairing that has a platform and an airfoil section that extends therefrom. The platform defines periphery edge faces, a gaspath face, and a non-gaspath face. The platform has a flange that projects radially from the non-gaspath face. The flange defines a forward flange face, an aft flange face, and a radial flange face. The flange has an end portion adjacent one of the periphery edges. The end portion includes a step that defines a radial step face that is radially intermediate the radial flange face and the non-gaspath face.

17 Claims, 5 Drawing Sheets

(56) References Cited

U.S. PATENT DOCUMENTS

| | | | |
|---|---|---|---|
| 2010/0047056 A1* | 2/2010 | Lee | F01D 25/12 |
| | | | 415/115 |
| 2013/0011265 A1 | 1/2013 | Miller et al. | |
| 2016/0215640 A1* | 7/2016 | Bergman | F01D 11/005 |
| 2016/0258294 A1* | 9/2016 | Weinert | F01D 5/10 |
| 2016/0362984 A1* | 12/2016 | Brandl | F01D 5/288 |
| 2019/0277676 A1* | 9/2019 | Koenig | F01D 17/08 |
| 2021/0140335 A1* | 5/2021 | Farrar | F01D 9/041 |

* cited by examiner

VANE ARC SEGMENT WITH FLANGE HAVING STEP

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A vane arc segment according to an example of the present disclosure includes an airfoil fairing that has a platform and an airfoil section that extends there from. The platform defines periphery edge faces, a gaspath face, and a non-gaspath face. The platform has a flange that projects radially from the non-gaspath face. The flange defines a forward flange face, an aft flange face, and a radial flange face. The flange has an end portion adjacent one of the periphery edges. The end portion includes a step that defines a radial step face that is radially intermediate the radial flange face and the non-gaspath face.

In a further embodiment, the forward flange face and the aft flange face each extend continuously from the non-gaspath side to the radial flange face.

In a further embodiment, the radial step face is a bearing face.

In a further embodiment, the radial step face is non-coated.

In a further embodiment, the airfoil fairing includes a coating disposed on the non-gaspath face, and the radial flange face is flush with the coating.

In a further embodiment, the airfoil fairing is formed of a ceramic matrix composite.

In a further embodiment, the forward flange face and the aft flange face each extend continuously from the non-gaspath side to the radial flange face, and the radial step face is non-coated.

In a further embodiment, the airfoil fairing includes a coating disposed on the non-gaspath face next to the step.

In a further embodiment, the radial flange face is flush with the coating.

In a further embodiment, the step defines a circumferential step face that is parallel to an immediately adjacent one of the periphery edges.

A gas turbine engine according to an example of the present disclosure includes first and second airfoil fairings each having a platform and an airfoil section extending there from. The platform defines periphery edge faces, a gaspath face, and a non-gaspath face. The platform has a flange that projects radially from the non-gaspath face. The flange defines a forward flange face, an aft flange face, and a radial flange face. The flange has an end portion adjacent one of the periphery edges. The end portion includes a step that defines a radial step face that is radially intermediate the radial flange face and the non-gaspath face. The first and second airfoil fairings are positioned adjacent one another such that there is a gap between the periphery edge face of the first airfoil fairing and the periphery edge face of the second airfoil fairing. The step of the first airfoil fairing is positioned opposite the step of the second airfoil fairing such that the steps together define a seal slot there between along the gap. A seal extends through the seal slot for sealing the gap. The seal slot retains the seal such that the seal bridges the gap.

In a further embodiment, the forward flange face and the aft flange face each extend continuously from the non-gaspath side to the radial flange face.

In a further embodiment, the radial step faces are bearing faces that bear against the seal.

In a further embodiment, the radial step face is non-coated.

In a further embodiment, the first and second airfoil fairings include a coating disposed on the non-gaspath face, and the radial flange faces are flush with the coating.

In a further embodiment, the forward flange face and the aft flange face each extend continuously from the non-gaspath side to the radial flange face, and the radial step face is non-coated.

In a further embodiment, each of the first and second airfoil fairings includes a coating disposed on the non-gaspath face next to the step.

In a further embodiment, the radial flange face is flush with the coating.

In a further embodiment, the first and second airfoil fairings are formed of a ceramic matrix composite.

A method for fabricating a vane arc segment according to an example of the present disclosure includes providing an airfoil fairing that has a platform and an airfoil section that extends there from. The platform defines periphery edge faces, a gaspath face, and a non-gaspath face. The platform has a flange projecting radially from the non-gaspath face. The flange defines a forward flange face, an aft flange face, and a radial flange face. The flange has an end portion adjacent one of the periphery edges. A coating is deposited along at least a portion of the non-gaspath side adjacent the end portion of the flange. A section of the end portion of the flange is removed to form a step that has a radial step face that is flush with the coating.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
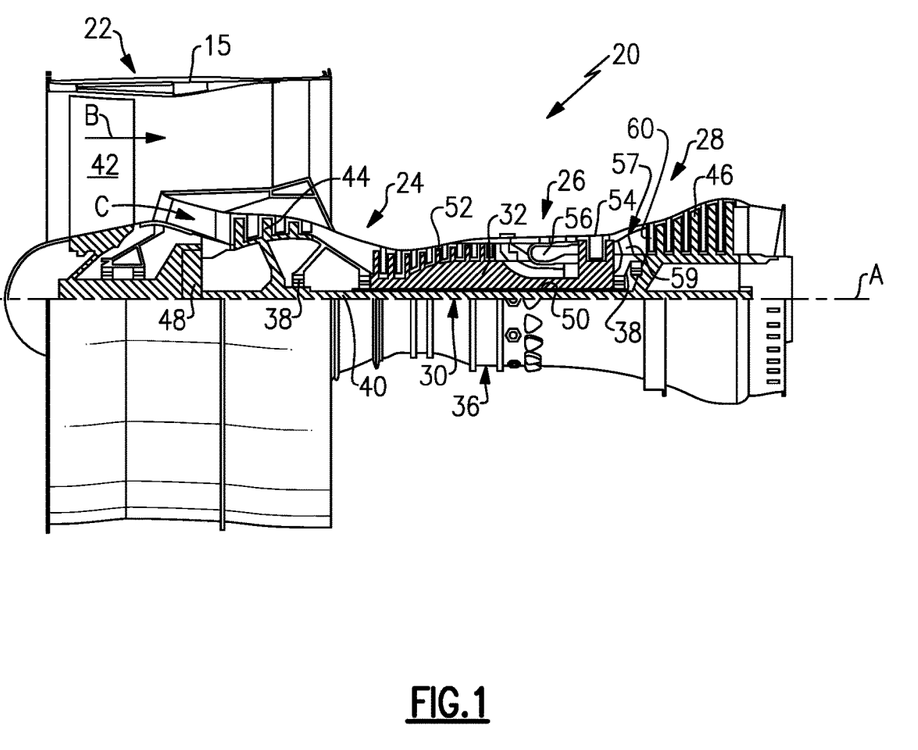
FIG. 1 illustrated an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
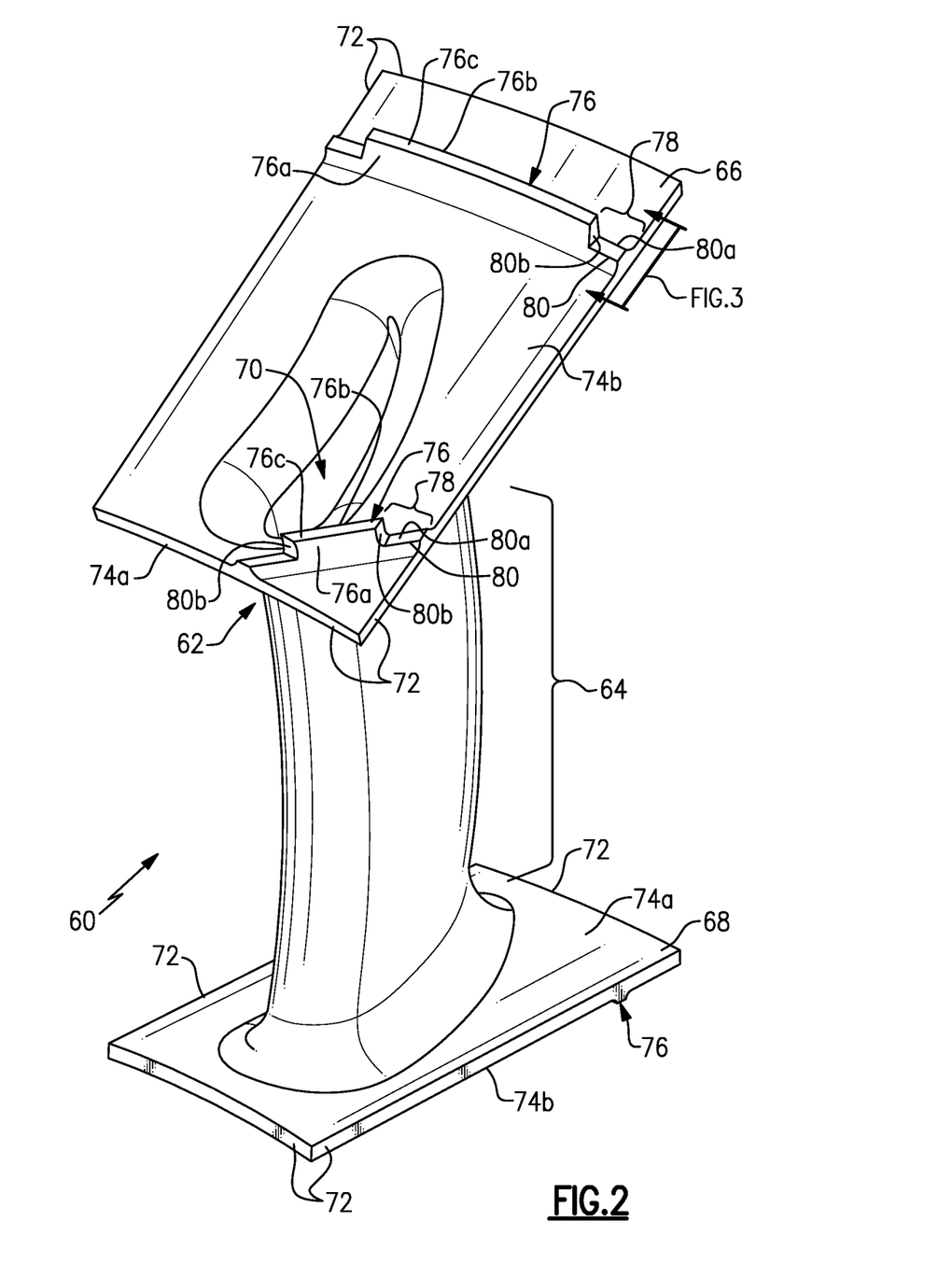
FIG. 2 illustrates a vane arc segment of the engine.

FIG. 2 illustrates a vane arc segment 60 from the turbine section 28 of the engine 20. A plurality of such vane arc segments 60 is situated in a circumferential row about the engine central axis A. Although the vane arc segment 60 is shown and described with reference to application in the turbine section 28, it is to be understood that the examples herein are also applicable to structural vanes in other sections of the engine 20.

The vane arc segment 60 is comprised of an airfoil fairing 62. The airfoil fairing 62 includes several sections, including an airfoil section 64 and first and second platforms 66/68 between which the airfoil section 64 extends. In this example, the airfoil section 64 circumscribes a central cavity 70. It is to be understood that although the illustrated example is a "singlet" with one airfoil section, the examples herein may also be applied to vane "doublets" that have two airfoil sections.

In this example, the airfoil fairing 62 is continuous in that the platforms 66/68 and airfoil section 64 constitute a unitary body. As an example, the airfoil fairings are formed of a ceramic matrix composite, an organic matrix composite (OMC), or a metal matrix composite (MMC). For instance, the ceramic matrix composite (CMC) is formed of ceramic fiber tows that are disposed in a ceramic matrix. The ceramic matrix composite may be, but is not limited to, a SiC/SiC ceramic matrix composite in which SiC fiber tows are disposed within a SiC matrix. Example organic matrix composites include, but are not limited to, glass fiber tows, carbon fiber tows, and/or aramid fiber tows disposed in a polymer matrix, such as epoxy. Example metal matrix composites include, but are not limited to, boron carbide fiber tows and/or alumina fiber tows disposed in a metal matrix, such as aluminum. A fiber tow is a bundle of filaments. As an example, a single tow may have several thousand filaments. The tows may be arranged in a fiber architecture, which refers to an ordered arrangement of the tows relative to one another, such as, but not limited to, a 2D woven ply or a 3D structure.

In the illustrated example, the first platform 66 is a radially outer platform and the second platform 68 is a radially inner platform. The platforms 66/68 define periphery edge faces 72, a gaspath face 74a, and a non-gaspath face 74b ("gaspath" refers to the core gaspath C of the engine 20). The periphery edge faces 72 generally include forward, aft, and circumferential faces that define the peripheral boundaries of the platforms 66/68. Terms such as "inner" and "outer" used herein refer to location with respect to the central engine axis A, i.e., radially inner or radially outer. Moreover, the terminology "first" and "second" used herein is to differentiate that there are two architecturally distinct components or features. It is to be further understood that the terms "first" and "second" are interchangeable in that a first component or feature could alternatively be termed as the second component or feature, and vice versa.

The platforms 66/68 include one or more flanges 76 that project radially from the non-gaspath sides 74b thereof. In this example implementation, the first platform 66 has two flanges 76 and the second platform 68 has a single flange 76, although different numbers of flanges 76 and/or different orientations of the flanges 76 could alternatively be used. The flanges 76 serve for mounting of the airfoil fairing 62 in the engine 20.

The geometry of the flanges 76 is of relatively low-complexity in comparison to hooked flanges or rails found in metal airfoils. Each flange 76 defines a forward flange face 76a, an aft flange face 76b, and a radial flange face 76c. In this case, the flanges 76 have a generally rectangular geometry, with the forward flange face 76a and the aft flange face 76b each extending continuously from the non-gaspath side 74b to the radial flange face 76c. Thus, in the illustrated example, the flanges 76 do not include hooks or other corner structures that would be difficult to manufacture from the above fiber-reinforced composites. The faces 76a/76b/76c (as well as circumferential step face 80b discussed below) may serve as load faces for transmitting aerodynamic or other loads from the airfoil fairing 62 to static support hardware on which the airfoil fairing 62 is mounted.

Each flange 76 has at least one end portion 78 that is located adjacent to one of the periphery edge faces 72. In the example shown, at least a portion of the flange 76 extends all the way to the periphery edge face 72 to form a corner there with. The end portion 78 includes a step 80 that defines a radial step face 80a and a circumferential step face 80b. The radial step face 80a is radially intermediate the radial flange face 76c and the non-gaspath face 74b.

Figure 3:
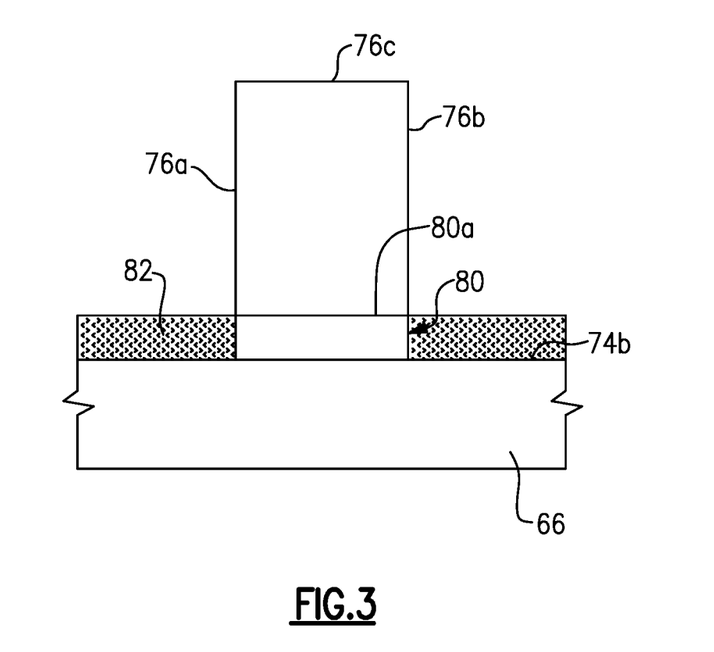
FIG. 3 illustrates a step of a flange on the vane arc segment.

Referring to FIG. 3, which shows the step 80 from a circumferential viewpoint, there is a coating 82 disposed on the non-gaspath face 74b of the platform 66. For example, the coating 82 is composed of elemental silicon, silicate, silica, hafnia, zirconia, or combinations thereof. The coating 82 may provide wear-resistance, thermal insulation, or both. The radial step face 80a is flush with the coating 82. That is, the surface of the coating 82 and the surface of the radial step face 80a (which is non-coated, at least by the coating 82) form a continuous plane. As will be appreciated, there are manufacturing tolerances associated with the step 80 and the coating 82 that may cause variations in the radial height of the step 80 and the thickness of the coating 82. The term "flush" as used herein encompasses variations that are within such tolerances. In one example, the radial step face 80a is flush with the coating 82 within a tolerance of +/−10% of the thickness of the coating 82 adjacent the step 80.

Figure 4:
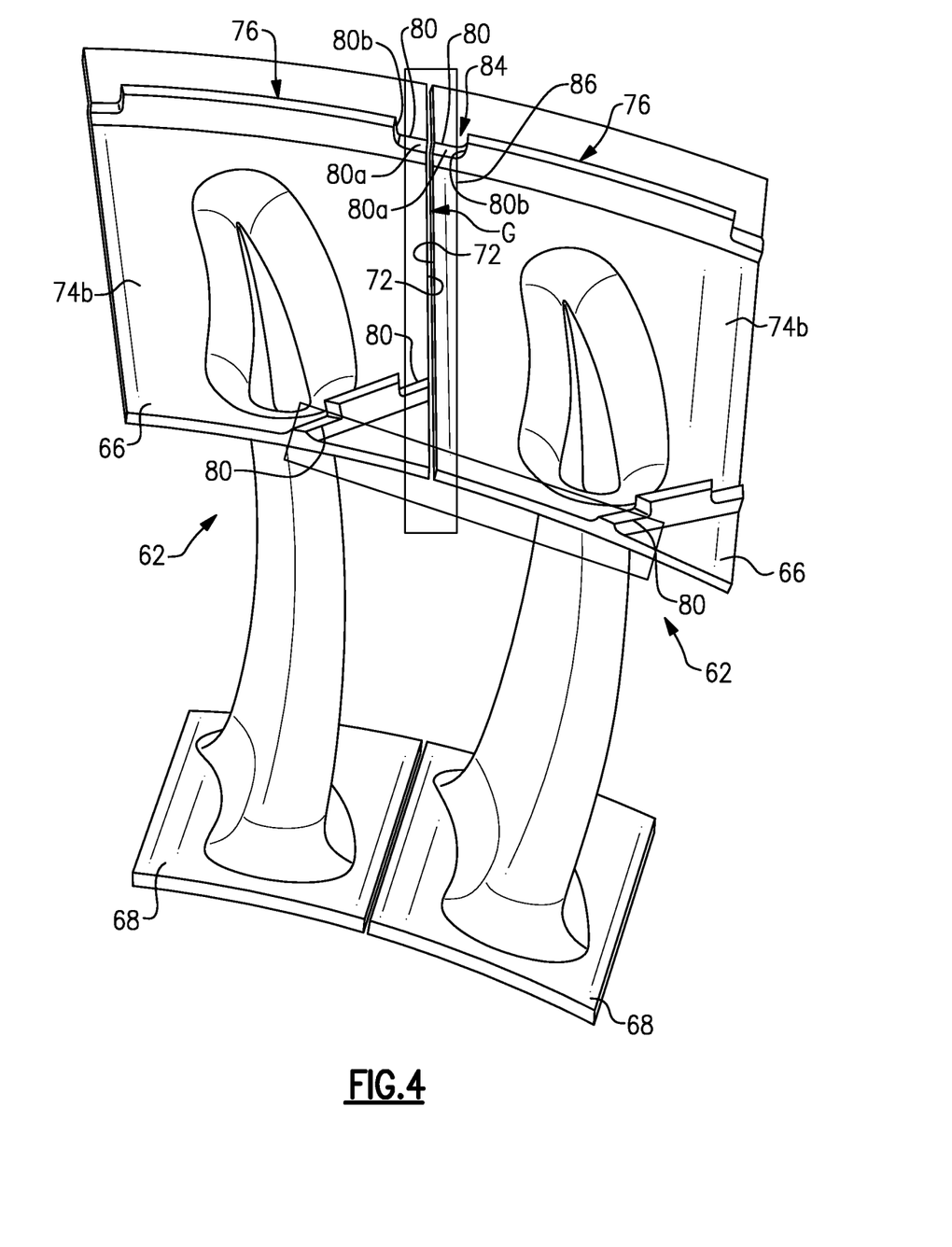
FIG. 4 illustrates two airfoil fairings with a seal.

Referring to FIG. 4, there are two airfoil fairings 62 positioned adjacent one another as in the engine 20 such that there is a gap G between the periphery edge faces 72 of the airfoil fairings 62. The step 80 of the first (left-hand side in FIG. 4) airfoil fairing 62 is positioned circumferentially opposite the step 80 of the second (right-hand side) airfoil fairing 62 such that the steps 80 together define a seal slot 84 there between along the gap G.

As shown in phantom, there is a seal 86 that extends through the seal slot 84 for sealing the gap G. For example, the seal 86 is a metal feather seal that is of substantially uniform thickness and is relatively thin in comparison to its length and width. In the illustrated example, the gap G is a mate face gap, although the examples herein could also be applied to sealing at the forward and/or trailing faces of the platforms 66/68, or other areas that require sealing.

The seal 86 seats on the coating 82, which is located only in the vicinity of the seal 86, and on the radial step faces 80a of the steps 80. The step faces 80a thus serve as bearing faces for contact with the seal 86. For optimal sealing, the seal 86 is in continuous contact with the radial step faces 80a and coating 82 along the entire length of the seal 86. Thus, having the radial step face 80a flush with the coating 82 provides a continuous surface to seal against.

As mentioned above, the flanges 76 serve to mount the airfoil fairing 62 and transmit loads. In this regard, the faces 72a/72b/72c/80b of the flange 76 serve as load bearing faces, and the step(s) 80 provides space for incorporation of the seal(s) 86. The circumferential step faces 80b may also serve as load bearing faces for tangential loads. In that regard, the orientations of the circumferential step faces 80b may be selected to enhance load transmission. In one example, at least one of the circumferential step faces 80b is parallel to its closest periphery edge face 72. The seal slot 84 facilitates retaining the seal 86 such that it bridges the gap G and is substantially centered over the gap G. For instance, the circumferential faces 80b of the opposed steps 80 serve to limit circumferential movement of the seal 86, thereby maintaining the seal 86 in bridged position across the gap G.

Figure 5:
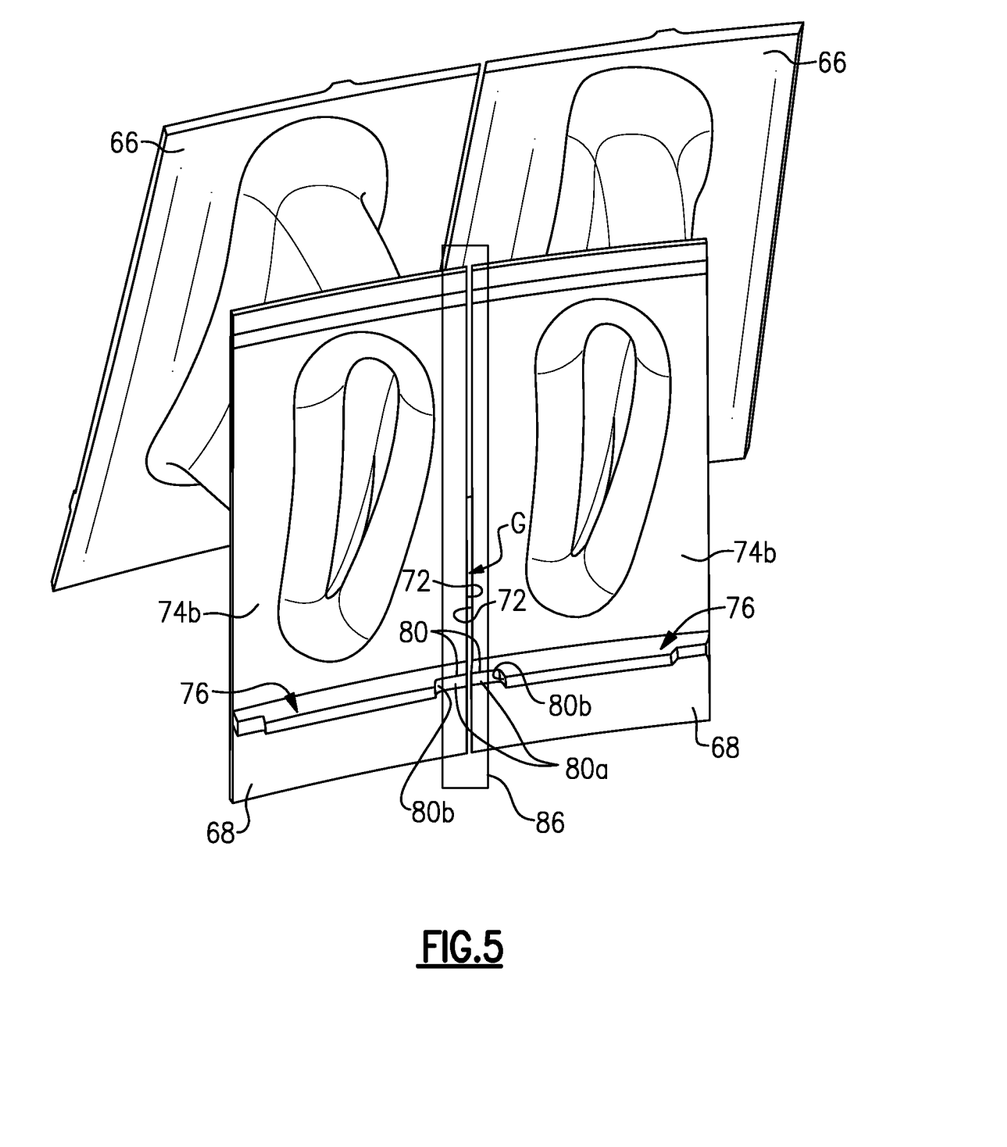
FIG. 5 illustrates the two airfoil fairings with a flange and seal on the other platform.

As also shown in FIG. 4, the steps 80 may also be used individually rather than in opposed pairs. In this regard, the circumferential step face 80b limits movement of the seal 86 in only one direction. As shown in FIG. 5, the steps 80 may additionally or alternatively be used on the inner platform 68 in the same manner as described above.

Also disclosed is a method of fabricating the airfoil fairing 62 as described above. Initially, the airfoil fairing 62 is provided without the coating 82 and with a full flange in which the aforementioned step 80 has not yet been formed. In that regard, the full height of the flange may extend all the way to the periphery edge face 72. The coating 82 is then deposited along at least a portion of the non-gaspath side 74b of the platform 66/68 adjacent the end portion 78 of the flange 76. If needed, the flange 76 may be masked to prevent application of the coating 82 on the flange 76. The coating deposition technique is not particularly limited and may be, but is not limited to, spraying or painting of slurries, vapor deposition, and plasma spray. It will be appreciated that the conditions for the coating deposition will depend on the type of coating 82 selected. Once the coating 82 has been deposited, a section of the end portion 78 is then removed from the flange 76 to form the step 80 and a radial step face 80a that is flush with the coating 82. For instance, the removal may be by machining, but is not limited thereto.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A vane arc segment comprising:
   an airfoil fairing having a platform and an airfoil section extending there from, the platform defining periphery edge faces, a gaspath face, and a non-gaspath face, the platform having a flange projecting radially from the non-gaspath face, the flange defining a forward flange face, an aft flange face, and a radial flange face, the flange having an end portion adjacent one of the periphery edges, the end portion including a step defining a radial step face that is radially intermediate the radial flange face and the non-gaspath face, the airfoil fairing including a coating disposed on the non-gaspath face, the radial step face being flush with the coating, the step partially defining a seal slot.

2. The vane arc segment as recited in claim 1, further comprising a seal disposed in the seal slot and seated against the coating and against the radial step face.

3. The vane arc segment as recited in claim 1, wherein the forward flange face and the aft flange face each extend continuously from the non-gaspath side to the radial flange face.

4. The vane arc segment as recited in claim 1, wherein the radial step face is non-coated.

5. The vane arc segment as recited in claim 1, wherein the airfoil fairing is formed of a ceramic matrix composite.

6. The vane arc segment as recited in claim 1, wherein the forward flange face and the aft flange face each extend continuously from the non-gaspath side to the radial flange face, and the radial step face is non-coated.

7. The vane arc segment as recited in claim 1, wherein the step defines a circumferential step face that is parallel to a closest adjacent one of the periphery edges.

8. A gas turbine engine comprising:
   a compressor section;
   a combustor in fluid communication with the compressor section; and
   a turbine section in fluid communication with the combustor, the turbine section includes:
      first and second airfoil fairings each having a platform and an airfoil section extending there from, the platform defining periphery edge faces, a gaspath face, and a non-gaspath face, the platform having a flange projecting radially from the non-gaspath face, the flange defining a forward flange face, an aft flange face, and a radial flange face, the flange having an end portion adjacent one of the periphery edges, the end portion including a step defining a radial step face that is radially intermediate the radial flange face and the non-gaspath face,
      the first and second airfoil fairings being positioned adjacent one another such that there is a gap between the periphery edge face of the first airfoil fairing and the periphery edge face of the second airfoil fairing,
      the step of the first airfoil fairing being positioned opposite the step of the second airfoil fairing such that the steps together define a seal slot there between along the gap, and
      a seal extending through the seal slot for sealing the gap, the seal slot retaining the seal such that the seal bridges the gap.

9. The gas turbine engine as recited in claim 8, wherein the forward flange face and the aft flange face each extend continuously from the non-gaspath side to the radial flange face.

10. The gas turbine engine as recited in claim 8, wherein the radial step faces are bearing faces that bear against the seal.

11. The gas turbine engine as recited in claim 8, wherein the radial step face is non-coated.

12. The gas turbine engine as recited in claim 8, wherein the first and second airfoil fairings include a coating disposed on the non-gaspath face, and the radial flange step faces are flush with the coating.

13. The gas turbine engine as recited in claim 8, wherein the forward flange face and the aft flange face each extend continuously from the non-gaspath side to the radial flange face, and the radial step face is non-coated.

14. The gas turbine engine as recited in claim 13, wherein each of the first and second airfoil fairings includes a coating disposed on the non-gaspath face next to the step.

15. The gas turbine engine as recited in claim 14, wherein the radial flange face is flush with the coating.

16. The gas turbine engine as recited in claim 8, wherein the first and second airfoil fairings are formed of a ceramic matrix composite.

17. A method for fabricating a vane arc segment, the method comprising:
   providing an airfoil fairing having a platform and an airfoil section that extends there from, the platform defines periphery edge faces, a gaspath face, and a non-gaspath face, the platform has a flange projecting radially from the non-gaspath face, the flange defines a forward flange face, an aft flange face, and a radial flange face, the flange having an end portion adjacent one of the periphery edges;
   depositing a coating along at least a portion of the non-gaspath side adjacent the end portion of the flange; and
   removing a section of the end portion of the flange to form a step that has a radial step face that is flush with the coating.

* * * * *